United States Patent
Alvi et al.

(10) Patent No.: US 12,447,831 B2
(45) Date of Patent: Oct. 21, 2025

(54) MOTOR SYSTEM CONTROL

(71) Applicant: GM Global Technology Operations LLC, Detroit, MI (US)

(72) Inventors: Muhammad Hussain Alvi, Troy, MI (US); Suresh Gopalakrishnan, Troy, MI (US); Alireza Fatemi, Canton, MI (US); Renato Amorim Torres, Pontiac, MI (US); Chunhao J. Lee, Troy, MI (US); Junghoon Kim, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 261 days.

(21) Appl. No.: 18/332,223

(22) Filed: Jun. 9, 2023

(65) Prior Publication Data

US 2024/0408974 A1    Dec. 12, 2024

(51) Int. Cl.
    *B60L 15/20*      (2006.01)
    *H02P 27/08*      (2006.01)

(52) U.S. Cl.
    CPC .......... *B60L 15/2045* (2013.01); *H02P 27/08* (2013.01); *B60L 2210/40* (2013.01); *B60L 2240/423* (2013.01)

(58) Field of Classification Search
    None
    See application file for complete search history.

(56) References Cited

U.S. PATENT DOCUMENTS

| | | | |
|---|---|---|---|
| 11,509,253 B2 | 11/2022 | Spaven et al. | |
| 11,689,133 B1 | 6/2023 | Alvi et al. | |
| 11,984,834 B2 | 5/2024 | Alvi et al. | |
| 2014/0018988 A1* | 1/2014 | Kitano | B60L 15/2045 701/22 |
| 2015/0006001 A1* | 1/2015 | Kawata | B60L 15/2045 180/65.265 |
| 2021/0203263 A1* | 7/2021 | Serrano | H02P 27/08 |
| 2022/0355703 A1 | 11/2022 | Fatemi et al. | |
| 2024/0113711 A1 | 4/2024 | Alvi et al. | |

* cited by examiner

*Primary Examiner* — James J Lee
*Assistant Examiner* — Jonathan E Reinert
(74) *Attorney, Agent, or Firm* — CANTOR COLBURN LLP (57) ABSTRACT

A motor system includes a rechargeable energy storage system, an alternating current motor, and a power inverter. Multiple efficiency maps may be provided, each representing a specific combination of control parameters and associated settings. The maps relate the motor's operating space (torque and speed) to corresponding efficiency solutions. The combination of control parameters and settings that yields the highest motor system efficiency at an operating point may be determined from the multiple efficiency maps and used in controlling the motor.

20 Claims, 4 Drawing Sheets

MOTOR SYSTEM CONTROL

INTRODUCTION

Electrified vehicles may include alternating current (AC) motor systems for providing propulsion torque to the vehicle's powertrain system. Motor systems may include rechargeable energy storage systems, an AC motor and a power inverter for converting direct current (DC) electrical power to AC electrical power for operating the AC motor. Motor systems may be configured with a number of parameters controllable at various settings, each of which may affect efficiency of associated components and/or overall motor system efficiency. Even relatively few controllable parameters and settings may represent a large number of potential combinations presenting control challenges to achieving most efficient overall motor system operation across the entire operating space of the AC motor.

SUMMARY

In one exemplary embodiment, a method of controlling a motor system including a rechargeable energy storage system (RESS), an alternating current (AC) motor and a power inverter therebetween may include providing a plurality of efficiency maps for control use consideration, each efficiency map corresponding to a respective predetermined combination of at least two motor system control parameters and relating a motor operating space in motor torque and motor speed to corresponding motor system efficiency solutions, wherein at least one of the at least two motor system control parameters includes at least two respective selectable settings, receiving a motor speed signal, receiving a motor torque command, determining from the plurality of efficiency maps a respective predetermined combination of the at least two motor system control parameters associated with a highest motor system efficiency solution at a motor operating point corresponding to the motor speed signal and the motor torque command, and controlling the motor based upon the respective predetermined combination of the at least two motor system control parameters.

In addition to one or more of the features described herein, the motor system control parameters may include a pulse-width modulation (PWM) scheme for operating the power inverter, a switching frequency for the power inverter, a gate drive parameter for the power inverter, and a direct current (DC) link voltage provided by the RESS to the power inverter.

In addition to one or more of the features described herein, the pulse-width modulation (PWM) scheme may include a first respective selectable setting that is a space vector pulse width modulation and a second respective selectable setting that is one of a generalized discontinuous pulse width modulation and a fractional duty pulse width modulation.

In addition to one or more of the features described herein, the switching frequency may include a first respective selectable setting that is a first frequency and a second respective selectable setting that is a second frequency, wherein the second frequency is a multiple of the first frequency.

In addition to one or more of the features described herein, the gate drive parameter may include a first respective selectable setting that is a first gate resistance and a second respective selectable setting that is a second gate resistance, wherein the second gate resistance is greater than the first gate resistance.

In addition to one or more of the features described herein, the DC link voltage may include a first respective selectable setting that is a first voltage and a second respective selectable setting that is a second voltage, wherein the second voltage is a multiple of the first voltage.

In addition to one or more of the features described herein, the motor system control parameters may consist of a pulse-width modulation (PWM) scheme for operating the power inverter, a switching frequency for the power inverter, a gate drive parameter for the power inverter, and a direct current (DC) link voltage provided by the RESS to the power inverter.

In addition to one or more of the features described herein, all of the at least two motor system control parameters may include at least two respective selectable settings.

In addition to one or more of the features described herein, each efficiency map may be reduced by eliminating respective motor system efficiency solutions within the motor operating space in motor torque and motor speed that are dominated by motor system efficiency solutions within the motor operating space in motor torque and motor speed of the other efficiency maps through a Pareto front analysis considering a set of motor system optimization objectives.

In addition to one or more of the features described herein, the set of motor system optimization objectives may include a first metric of noise, vibration and harshness, a second metric of motor bearing life, and a third metric of RESS life.

In addition to one or more of the features described herein, at least one of the plurality of efficiency maps may be withdrawn from control consideration based upon a determined unacceptable effect upon at least one of a set of motor system efficiency trade off objectives at the motor operating point.

In addition to one or more of the features described herein, the set of motor system efficiency trade off objectives may include a first metric of noise, vibration and harshness, a second metric of motor bearing life, and a third metric of RESS life.

In another exemplary embodiment, a method of controlling a motor system including a rechargeable energy storage system (RESS), an alternating current (AC) motor and a power inverter therebetween may include providing a plurality of efficiency maps for control use consideration, each efficiency map corresponding to a respective predetermined combination of at least two motor system control parameters and relating a motor operating space in motor torque and motor speed to corresponding motor system efficiency solutions, wherein at least one of the at least two motor system control parameters includes at least two respective selectable settings, establishing a motor operating point corresponding to a motor speed signal and a motor torque command, withdrawing a respective efficiency map from control use consideration based upon its determined unacceptable effect upon at least one of a set of motor system efficiency trade off objectives at the motor operating point, determining from the plurality of efficiency maps available for control use consideration a respective predetermined combination of the at least two motor system control parameters associated with a highest motor system efficiency solution at the motor operating point, and controlling the motor based upon the respective predetermined combination of the at least two motor system control parameters.

In addition to one or more of the features described herein, the motor system control parameters may include a pulse-width modulation (PWM) scheme for operating the power inverter, a switching frequency for the power inverter, a gate drive parameter for the power inverter, and a direct current (DC) link voltage provided by the RESS to the power inverter.

In addition to one or more of the features described herein, each efficiency map may be reduced by eliminating respective motor system efficiency solutions that are dominated by motor system efficiency solutions of the other efficiency maps through a Pareto front analysis considering a set of motor system optimization objectives.

In addition to one or more of the features described herein, the set of motor system optimization objectives may include a first metric of noise, vibration and harshness, a second metric of motor bearing life, and a third metric of RESS life.

In addition to one or more of the features described herein, the motor system control parameters may consist of a pulse-width modulation (PWM) scheme for operating the power inverter, a switching frequency for the power inverter, a gate drive parameter for the power inverter, and a direct current (DC) link voltage provided by the RESS to the power inverter.

In addition to one or more of the features described herein, all of the at least two motor system control parameters may include at least two respective selectable settings.

In yet another exemplary embodiment, an electrified powertrain may include a rechargeable energy storage system (RESS), a traction power inverter module (TPIM) connected to the RESS, and configured to change a direct current (DC) voltage from the RESS to a multi-phase alternating current (AC) voltage, a rotary electric machine energized by the multi-phase AC voltage from the TPIM over a multi-phase AC bus including a stator having multi-phase AC stator windings, a rotor, and a rotor shaft connected to and surrounded by the rotor and configured to rotate about an axis of rotation in conjunction with the rotor when the rotary electric machine is energized, a transmission coupled to the rotor shaft and powered by the rotary electric machine, and a controller providing a plurality of efficiency maps for control use consideration, each efficiency map corresponding to a respective predetermined combination of a plurality of motor system control parameters and relating a motor operating space in motor torque and motor speed to corresponding motor system efficiency solutions, wherein each of a plurality of motor system control parameters includes at least two respective selectable settings, establishing a motor operating point corresponding to a motor speed signal and a motor torque command, withdrawing a respective efficiency map from control use consideration based upon its determined unacceptable effect upon at least one of a set of motor system efficiency trade off objectives at the motor operating point, reducing each efficiency map by eliminating respective motor system efficiency solutions that are dominated by motor system efficiency solutions of the other efficiency maps through a Pareto front analysis considering respective values of a set of motor system optimization objectives, determining from the plurality of reduced efficiency maps available for control use consideration a respective predetermined combination of the plurality of motor system control parameters associated with one of a) a highest motor system efficiency solution at the motor operating point and b) a highest optimization score from an optimization function performed against the respective values of the set of motor system optimization objectives corresponding to each reduced efficiency map having a respective non-dominated solution at the motor operating point, and controlling the motor based upon the respective predetermined combination of the plurality of motor system control parameters.

In addition to one or more of the features described herein, the set of motor system efficiency trade off objectives and the set of motor system optimization objectives each may include a respective first metric of noise, vibration and harshness, a respective second metric of motor bearing life, and a respective third metric of RESS life.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. Throughout the drawings, corresponding reference labels indicate like or corresponding parts and features. Description of parts and features in one drawing is understood to apply to parts and features in other drawings sharing the same reference labels to the extent such parts and features are not otherwise distinguishable through drawing examination by one having ordinary skill in the art or distinguished by additional written description herein.

Figure 1:
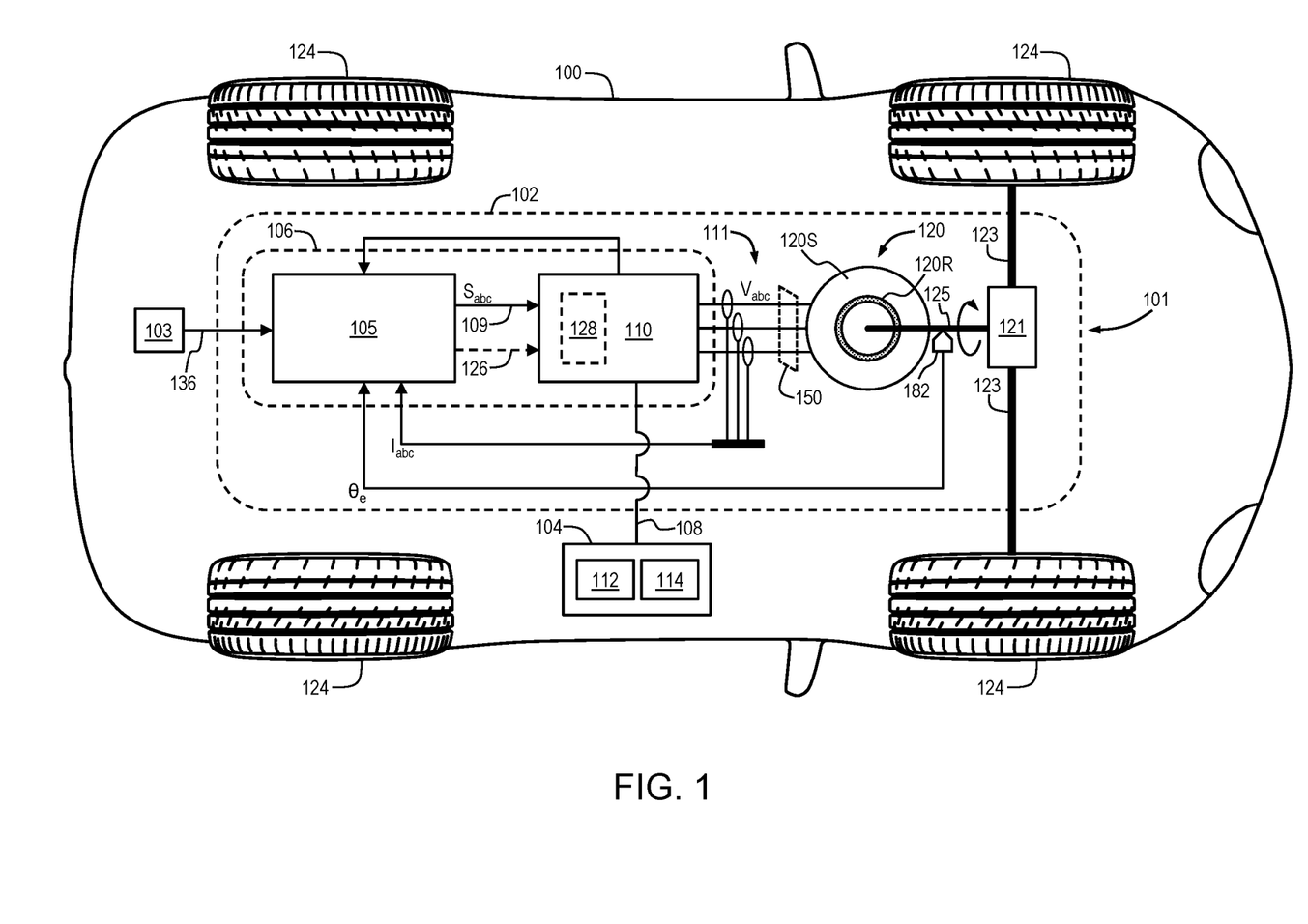
FIG. 1 illustrates an electric propulsion system on a vehicle, in accordance with one or more embodiments.

FIG. 1 schematically illustrates an embodiment of an electric propulsion system 101 on an electrified vehicle 100. Vehicle and vehicular are understood to refer to any means of transportation including non-limiting examples of motorcycles, cars, trucks, buses, excavation, earth moving, construction and farming equipment, railed vehicles like trains and trams, and watercraft like ships and boats. The electric propulsion system 101 may include various control components, electrical systems and electro-mechanical systems including, for example, a rechargeable energy storage system (RESS) 104 and an electric drive unit (EDU) 102. The electric propulsion system 101 may be employed on a powertrain system to generate propulsion torque as a replacement for, or in conjunction with, an internal combustion engine in various electric vehicle (EV) applications and hybrid electric vehicle (HEV) applications, respectively.

The EDU 102 may be of varying complexity, componentry and integration. An exemplary highly integrated EDU 102 may include, for example, a rotary electric machine such as an alternating current (AC) motor (motor) 120 and a traction power inverter module (TPIM) 106 including a motor controller 105 and a power inverter 110. The motor 120 may include a stator 120S and a rotor 120R coupled to a rotor shaft 125 and position sensor 182, for example a variable reluctance resolver or an encoder. The position sensor 182 may signally connect directly to the motor controller 105 and is employed to monitor angular position ($\theta_e$) of the rotor of the motor 120. The angular position ($\theta_e$) of the rotor of the motor 120 is employed by the motor controller 105 to control operation of the power inverter 110 that controls torque production and other functions of the motor 120, including through the first derivative quantity of angular speed (i.e., motor speed).

The rotor shaft 125 may transfer torque between the motor 120 and driveline components, some of which may be integrated within the EDU 102, for example in a gearbox 121 including reduction and differential gear sets and one or more axle outputs. The gearbox 121 may simply include reduction gearing and a prop shaft output for coupling to a differential gear set. One or more axles 123 may couple to the gearbox 121 directly or through final drive or differential gear sets if separate therefrom. Axle(s) 123 may couple to one or more vehicle wheel(s) 124 for transferring tractive force between a wheel and pavement. One having ordinary skill in the art will recognize alternative arrangements for driveline components. Propulsion torque requests or commands 136 ($T_{cmd}$) may be provided by a vehicle controller 103 to the motor controller 105 as a discrete input of over a network bus such as a CAN bus.

Any controller may include one or more control modules. As used herein, control module, module, control, controller, control unit, electronic control unit, processor and similar terms mean any one or various combinations of one or more of Application Specific Integrated Circuit(s) (ASIC), electronic circuit(s), central processing unit(s) (preferably microprocessor(s)) and associated memory and storage (read only memory (ROM), random access memory (RAM), electrically programmable read only memory (EPROM), hard drive, etc.) or microcontrollers executing one or more software or firmware programs or routines, combinational logic circuit(s), input/output circuitry and devices (I/O) and appropriate signal conditioning and buffer circuitry, high speed clock, analog to digital (A/D) and digital to analog (D/A) circuitry and other components to provide the described functionality. A control module may include a variety of communication interfaces including point-to-point or discrete lines and wired or wireless interfaces to networks including wide and local area networks, a controller area network (CAN) bus, and in-plant and service-related networks including for over the air (OTA) software updates. Functions of a control module as set forth in this disclosure may be performed in a distributed control architecture among several networked control modules. Software, firmware, programs, instructions, routines, code, algorithms and similar terms mean any controller executable instruction sets including calibrations, data structures, and look-up tables. A control module may have a set of control routines executed to provide described functions. Routines are executed, such as by a central processing unit, and are operable to monitor inputs from sensing devices and other networked control modules and execute control and diagnostic routines to control operation of actuators. Routines may be executed at regular intervals during ongoing engine and vehicle operation. Alternatively, routines may be executed in response to occurrence of an event, software calls, or on demand via user interface inputs or requests.

The RESS 104 may, in one embodiment, include one or more electro-chemical battery packs 112, for example high capacity, high voltage (HV) rechargeable lithium ion battery packs for providing power to the vehicle via a HV direct current (DC) bus 108. The RESS 104 may also include a battery manager module 114. The RESS 104 may include one or more battery packs 112 constructed from a plurality of battery pack modules allowing for flexibility in configurations and adaptation to application requirements. Battery packs may include a plurality of battery pack modules constructed from a plurality of cells allowing for flexibility in configurations and adaptation to application requirements. Battery pack modules may include a plurality of cells allowing for flexibility in configurations and adaptation to application requirements. For example, in vehicular uses, the RESS 104 may be modular to the extent that the number of battery pack modules may be varied to accommodate a desired energy density or range objective of a particular vehicle platform, intended use, or cost target. Battery packs and battery pack modules may be variously and selectively configured in accordance with desired propulsion architecture and charging and discharging functions. It is understood that the RESS 104 may be reconfigurable at any level of integration including battery pack, battery module and cell. In an embodiment, the RESS may be selectively configured to provide the HV direct current (DC) bus 108 with two or more voltage levels, for example 800 volts and 400 volts.

The motor 120 may be a multi-phase AC motor receiving multi-phase AC power over a multi-phase power bus (AC bus) 111 which is coupled to the power inverter 110. In one embodiment, the motor 120 is a three-phase motor and the power inverter 110 is a three-phase inverter. The power inverter 110 may include a plurality of solid-state switches in a solid-state switching section. The power inverter 110 couples to DC power over the HV DC bus 108 (DC input voltage ($V_{dc}$)) from the RESS 104, for example selectively at 400 or 800 volts. The voltage level of the HV DC bus 108 may be selected, established or otherwise set by the battery manager module 114 as may be requested by the motor controller 105. The voltage level of the HV DC bus may be referred to as the DC link voltage. The motor controller 105 is coupled to the power inverter 110 for control thereof. The power inverter 110 electrically connects to stator phase windings of a three-phase stator winding of the motor 120 via the AC bus 111, with electric current ($I_{abc}$) monitored on two or three phases thereof. The AC bus 111 provides conductive coupling of the multi-phase outputs of the power inverter 110 to phase terminals of the stator windings. The AC bus 111 may include AC bus features of the TPIM 106, AC bus features of the motor 120 and conductors connecting the AC bus features of the TPIM 106 and the AC bus features of the motor 120. As used herein, AC bus 111 includes all high voltage/high current phase conductors between the switching section of the power inverter 110 and the motor 120 including, for example, bus bars, cables, rods etc. The power inverter 110 may be configured with suitable control circuits including paired power transistors (e.g., IGBTs) for transforming high-voltage DC voltage on the HV DC bus 108 to high-voltage three-phase AC voltage ($V_{abc}$) on the AC bus 111 and transforming high-voltage three-phase AC voltage ($V_{abc}$) on the AC bus 111 to high-voltage DC voltage on the HV DC bus 108. The power inverter 110 may selectively employ any suitable pulse width modulation (PWM) scheme, for example sinusoidal pulse width modulation (SPWM) or other continuous pulse width modulation (CPWM), space vector pulse width modulation (SVPWM) or other discontinuous pulse width modulation (DPWM) including generalized discontinuous pulse width modulation (GDPWM) as well as adaptive (APWM), variable frequency (VFPWM), fractional duty (FDPWM) pulse width modulation variants and others to generate switching vector signals ($S_{abc}$) 109 to convert stored DC electric power originating in the battery pack 112 of the RESS 104 to AC electric power to drive the motor 120 to generate torque. The PWM scheme may be selected, established or otherwise set by the motor controller. Similarly, the power inverter 110 may convert mechanical power transferred to the motor 120 to DC electric power to generate electric energy that is storable in the battery pack 112 of the RESS 104, including as part of a regenerative braking control strategy. The power inverter 110 may be configured to receive the switching vector signals ($S_{abc}$) 109 from motor controller 105 and control inverter states to provide the motor drive and regeneration functionality. Switching vector signals ($S_{abc}$) 109 may also be referred to herein as conduction commands and are understood to inherently include the power inverter switching frequency (FSW) which may be selected, established or otherwise set by the motor controller 105. Other control signals may be provided from and to the motor controller 105, including for example an inverter gate drive parameter control signal 126 to select, establish or otherwise set slew rate, gate drive resistance, or other inverter gate drive parameter in a gate drive module 128 of the power inverter 110 for controlling the switching section of the power inverter 110.

Control of the power inverter 110 may include high frequency switching of the solid-state switches in accordance with the PWM control. A number of design and application considerations and limitations determine inverter switching frequency and PWM control. Inverter controls for AC motor applications may include fixed switching frequencies, for example switching frequencies around 10-30 kHz and PWM controls that minimize switching losses of the IGBTs or other power switches of the power inverter 110. Higher switching frequencies may be achievable with emerging solid-state switching technologies such as silicon carbide (SiC) MOSFETs, gallium nitride (GaN) transistors, diamond MOSFETs, carbon nano-tube transistors, and graphene-based transistors.

The disclosed improvements relate to a multi-phase AC motor 120, and may be realized in HEV and EV embodiments of the electrified vehicle 100 without limitation, as well as in non-vehicular applications such as power plants, hoists, mobile platforms and robots, etc. The motor 120 may, for example, be an interior permanent magnet (IPM) machine, a permanent magnet synchronous reluctance (PMSR) machine, a synchronous reluctance (SR) machine, an induction machine, or any AC machine including a multi-phase AC stator 120S.

The power inverter 110 operates by synthesizing multi-phase AC voltages which are applied to corresponding phase windings of the multi-phase stator 120S of the motor 120 over the AC bus 111. In a balanced three phase system the three fundamental AC voltages may be substantially sinusoidal and separated by 120 degrees. The summation of the three phase voltages would be equal to zero in an ideal system.

In an embodiment, a number of motor system control parameters may be identified for use in controlling a motor system. A motor system may include an AC motor such as motor 120, a power inverter such as TPIM 110 and an electrical power source such as RESS 104, for example as set forth herein with respect to the electrified vehicle 100. Non-limited, exemplary motor system control parameters may include a pulse-width modulation (PWM) scheme for operating the power inverter, a switching frequency for the power inverter, a gate drive parameter for the power inverter, and a direct current (DC) link voltage provided by the RESS to the power inverter. In an embodiment, at least two motor system control parameters may be employed in controlling the motor system and at least one of the motor system control parameters may have at least two selectable settings. For example, in an embodiment, the motor system control parameters may include a PWM scheme and a switching frequency with the PWM scheme including at least two PWM settings selected from a space vector pulse width modulation, a generalized discontinuous pulse width modulation, a fractional duty pulse width modulation or any other suitable PWM modulation scheme. The switching frequency may include two or more switching frequency settings such as, for example, 10 kHz and 20 KHz. Alternative embodiments may include other groupings of the exemplary motor system control parameters including a grouping of all such motor system control parameters. In embodiments employing a gate drive parameter for the power inverter as a motor system control parameter, various gate drive parameters may include gate drive resistance, slew rate, or other controllable inverter gate drive parameters. In embodiments employing a direct current (DC) link voltage provided by the RESS to the power inverter as a motor system control parameter, various voltage settings may be selectively employed. For example, a modular, reconfigurable RESS may be selectively configured to supply different voltages to the power inverter. Advantageously, the voltage settings may be multiples of each other. For example, a RESS may include multiple modules at 400 volts allowing for configuring a DC link voltage supplied to the power inverter at 400 volts or 800 volts. Similarly, a RESS may include multiple modules at 200 volts allowing for configuring a DC link voltage supplied to the power inverter at 200 volts, 400 volts, 600 volts or 800 volts.

Figure 2A:
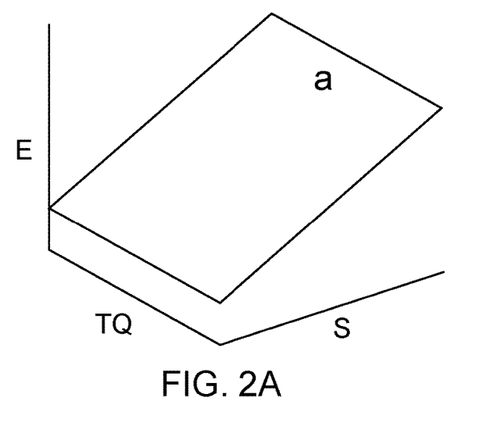
FIGS. 2A-2C illustrate exemplary motor system efficiency mappings for respective combinations of motor system control parameters and respective settings, in accordance with one or more embodiments.
Figure 2B:
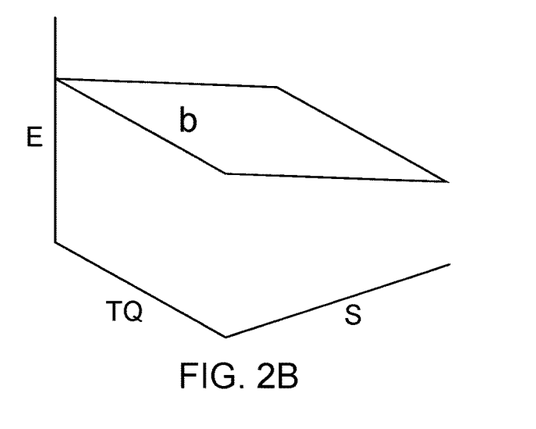
Figure 2C:
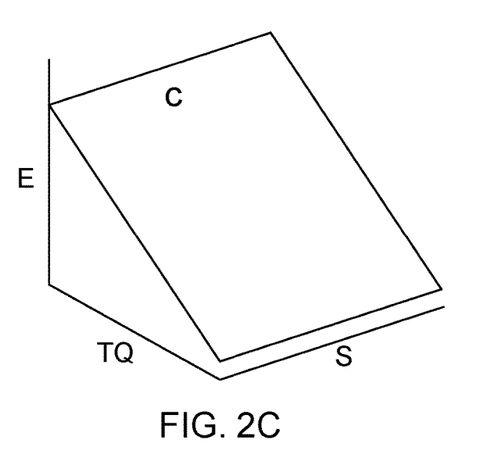

Each combination of the motor system control parameters and respective settings may be employed across a motor operating space in torque and speed to provide an associated map of efficiency. Examples of such efficiency mapping are discussed further herein with respect to FIGS. 2A-2C and FIGS. 3A and 3B. The three dimension axes of FIGS. 2A-2C and FIGS. 3A and 3B are motor torque (TQ), motor speed(S) and motor system efficiency (E). Efficiency may be represented for example by a measure of mechanical power out at the motor shaft (motor torque times motor speed) divided by electrical power in at the inverter (DC link voltage times DC link current). FIG. 2A illustrates a three-dimensional efficiency mapping corresponding to a first unique combination of motor system control parameters and respective settings, for example a PWM scheme with a SVPWM setting and a switching frequency of 10 kHz. Thus, FIG. 2A illustrates a solution surface (a) representing motor system efficiency solutions across the operating space in motor torque and motor speed (i.e., motor torque vs. motor speed) during operation with the first unique combination of motor system control parameters and respective settings. FIG. 2B illustrates a three-dimensional efficiency mapping corresponding to a second unique combination of motor system control parameters and respective settings, for example a PWM scheme with a GDPWM setting and a switching frequency of 10 kHz. Thus, FIG. 2B illustrates a solution surface (b) representing motor system efficiency solutions across the operating space in motor torque and motor speed (i.e., motor torque vs. motor speed) during operation with the second unique combination of motor system control parameters and respective settings. FIG. 2C illustrates a three-dimensional efficiency mapping corresponding to a third unique combination of motor system control parameters and respective settings, for example a PWM scheme with a GDPWM setting and a switching frequency of 20 kHz. Thus, FIG. 2C illustrates a solution surface (c) representing motor system efficiency solutions across the operating space in motor torque and motor speed (i.e., motor torque vs. motor speed) during operation with the third unique combination of motor system control parameters and respective settings. The solution surfaces (a), (b) and (c) of FIGS. 2A-2C are illustrative of the concept described herein, but do not represent actual efficiency data or actual combinations of motor system control parameters. One having ordinary skill in the art appreciates that actual motor operating space correspondence to motor system efficiency solutions as visually depicted in FIGS. 2A-2C may be derived empirically or through simulation and stored in non-volatile memory data structures such as reference tables.

Figure 3A:
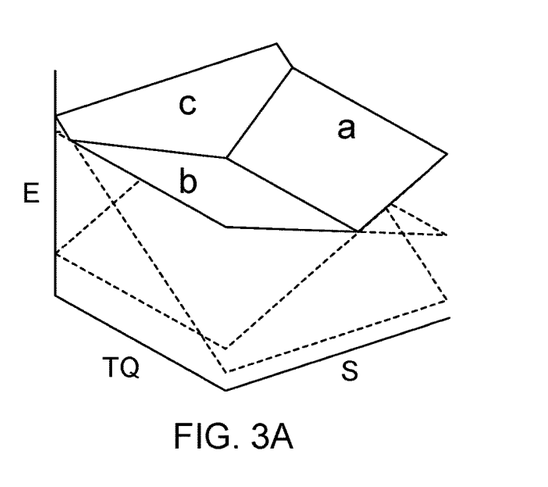
FIGS. 3A and 3B illustrate exemplary three-dimensional and two-dimensional efficiency mappings, respectively, corresponding to consolidated FIGS. 2A-2C, in accordance with one or more embodiments.
Figure 3B:
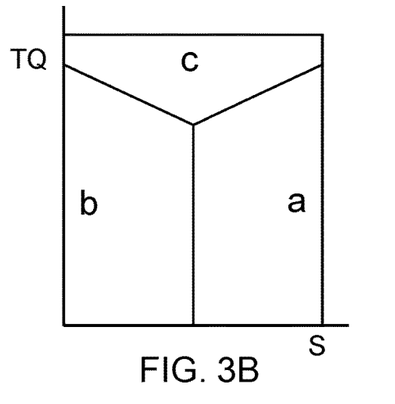

In an embodiment, a highest efficiency solution from among the unique combinations of motor system control parameters may be determined for any given operating point (i.e., motor torque and motor speed combination) within the motor operating space. Any suitable loss minimization function, efficiency maximization function, comparison or arbitration operative upon the solution surface (a), (b) and (c) data may therefore identify the highest efficiency solution at any given operating point and the corresponding unique combination of motor system control parameters. It is appreciated that while each unique combination of motor system control parameters may be associated with a corresponding efficiency solution in the respective solution surface, the highest efficiency solution for any given operating point may correspond to one of the unique combinations of motor system control parameters. Thus, FIG. 3A provides a three dimensional representation of the highest efficiency solutions (delimited by solid lines) within the operating space of the motor (i.e., torque and speed) from among the three exemplary unique combination of motor system control parameters of FIGS. 2A-2C and their corresponding solution surfaces (a), (b) and (c). It is appreciated that a view of FIG. 3A along the efficiency axis (E) may project the regions of the highest efficiency solution surfaces (a), (b) and (c) upon the torque (TQ) and speed(S) plane as shown in FIG. 3B.

Figure 4A:
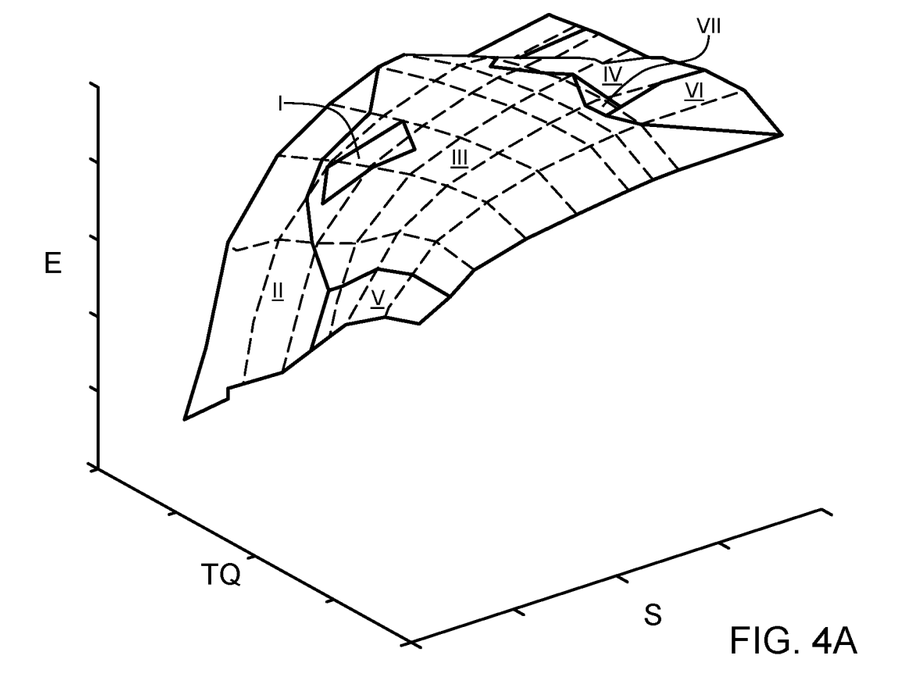
FIGS. 4A and 4B illustrate exemplary motor system efficiency mappings for respective combinations of motor system control parameters and respective settings, in accordance with one or more embodiments.
Figure 4B:
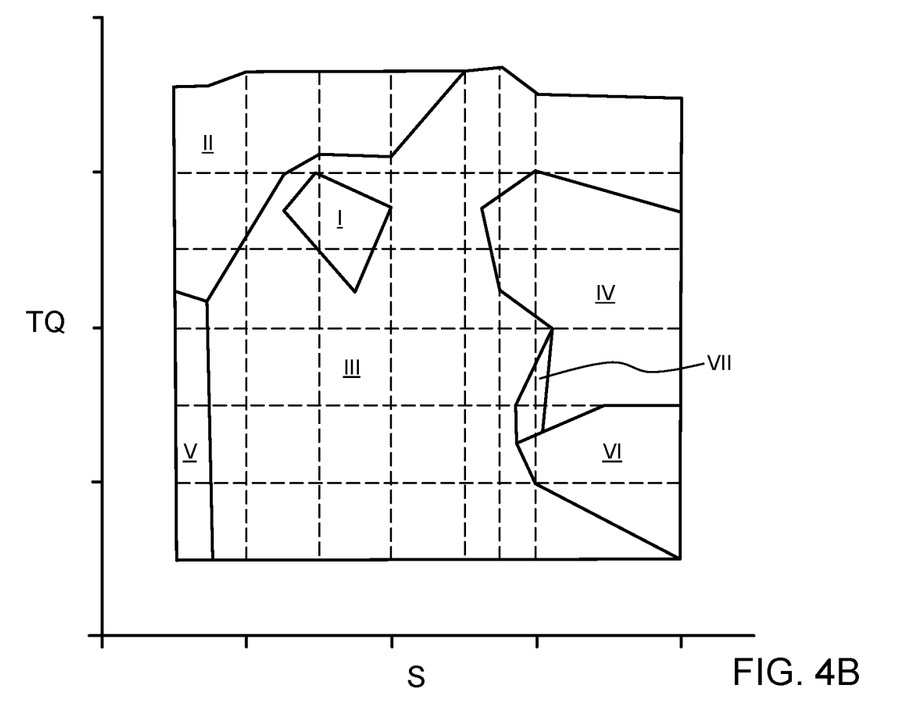

FIGS. 4A and 4B illustrate three-dimensional and corresponding two-dimensional efficiency solutions in an exemplary motor torque (TQ) versus motor speed(S) operating space analogous to the efficiency solutions set forth and described herein with respect to FIGS. 2A-2C and FIGS. 3A and 3B. FIGS. 4A and 4B, however, illustrate an extension of the concept to additional exemplary motor system control parameters. In the embodiment represented in FIGS. 4A and 4B, the motor control parameters may include a pulse-width modulation scheme (PWM) for operating the power inverter, a switching frequency (FSW) for the power inverter, and a DC link voltage (VDC) provided by the RESS to the power inverter. Other embodiments may include fewer, additional or other control parameters, such as gate drive parameters (GATE) for the power inverter. In the embodiment represented in FIGS. 4A and 4B, each of the exemplary motor control parameters PWM, FSW and VDC may include two selectable settings, though other embodiments may include more than two selectable settings for one or more of the motor control parameters. In the illustrated embodiment, the pulse-width modulation scheme PWM may have selectable settings of SVPWM and GDPWM, though other embodiments may utilize other selectable settings and combinations including from such non-limiting examples as SPWM, CPWM, SVPWM, DPWM, GDPWM, APWM, VFPWM, FDPWM or other suitable pulse-width modulation schemes PWM. In the illustrated embodiment, the switching frequency FSW may have exemplary, non-limited selectable settings of a lower frequency such as 10 kHz and an upper frequency such as 20 kHz, though other embodiments may utilize other and/or additional selectable frequencies and combinations including lower and upper frequencies and intermediate frequencies. In the illustrated embodiment, the DC link voltage (VDC) may have exemplary, non-limited selectable settings of a lower voltage such as 400 volts and an upper voltage such as 800 volts, though other embodiments may utilize other and/or additional selectable voltages and combinations including lower and upper voltages and intermediate voltages. In an embodiment employing a gate drive parameter GATE, gate drive resistance, slew rate, or other gate drive parameters may be utilized. Gate drive resistance may have exemplary, non-limited selectable settings of a lower value such as 5 ohms and an upper value such as 10 ohms, though other embodiments may utilize other and/or additional selectable values and combinations including lower and upper values and intermediate values. Gate drive slew rate may have exemplary, non-limited selectable settings of a lower value and an upper value, though other embodiments may utilize other and/or additional selectable values and combinations including lower and upper values and intermediate values.

In the present embodiment illustrated in FIGS. 4A and 4B, certain unique combinations of the exemplary motor system control parameters PWM, FSW and VDC and respective settings are designated with a roman numeral from table 1 herein to label corresponding highest efficiency solution surfaces in the motor torque (TQ) versus motor speed(S) operating space. FIG. 4A provides a three dimensional representation of the highest efficiency solutions (surfaces delimited by solid lines) within the operating space of the motor (i.e., torque and speed) from among the exemplary unique combinations I-VII of the exemplary motor system control parameters PSW, FSW and VDC and their respective settings. It is appreciated that a view of FIG. 4A along the efficiency axis (E) may project the regions of the corresponding highest efficiency solution surfaces upon the torque (TQ) and speed(S) plane as shown in FIG. 4B. One having ordinary skill in the art appreciates that actual motor operating space correspondence to motor system efficiency solutions as visually depicted in FIGS. 4A and 4B may be derived empirically or through simulation and stored in non-volatile memory data structures such as reference tables.

TABLE 1

| Combination | PSW Setting | FSW Setting | VDC Setting |
| --- | --- | --- | --- |
| I | GDPWM | 10 kHz | 400 Volt |
| II | GDPWM | 20 kHz | 400 Volt |
| III | SVPWM | 10 kHz | 400 Volt |
| IV | SVPWM | 20 kHz | 400 Volt |
| V | GDPWM | 10 kHz | 800 Volt |
| VI | GDPWM | 20 kHz | 800 Volt |
| VII | SVPWM | 10 kHz | 800 Volt |

Figure 5:
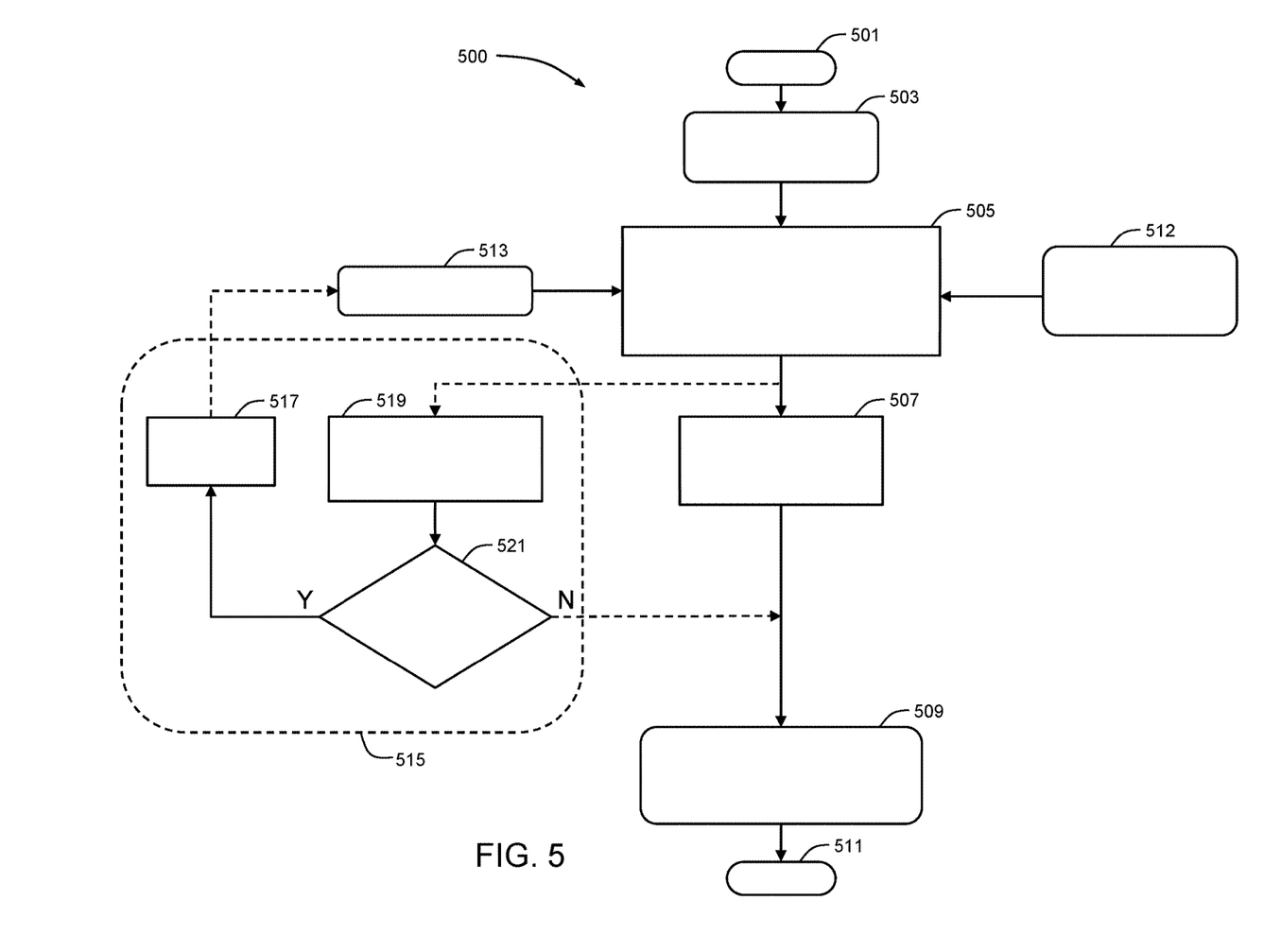
FIG. 5 illustrates an exemplary implementation of a motor system control, in accordance with one or more embodiments.

FIG. 5 is a process flow 500 illustrating an exemplary implementation of a motor system control in accordance with an embodiment. During ongoing vehicle operation, the process flow 500 may be repetitively executed as part of an overall electrified vehicle 100 control. The process flow 600 may represent routines and functions executed or performed, at least in part, by a processor or processors disposed in the electrified vehicle 100 of FIG. 1, including within one or more of the various controllers (e.g., 103, 105, 114) and acting on or in conjunction with the various tangible hardware and devices including the electric propulsion system 101 described herein. The routines may represent instruction sets stored in non-transitory memory and executed by the processor of one or more controllers. The routines and functions of process flow 600 are illustrated with individual tasks and groups of tasks in a substantially linear fashion. One skilled in the art will understand that the process flow 600 described may be represented in alternative ways including state flow diagrams and activity diagrams, for example. One skilled in the art also understands that the various tasks in the process flow 600 may be implemented in different orders and/or simultaneously, and consolidated or split. The process flow 600 may be discussed in conjunction with the electric propulsion system 101 of the exemplary electrified vehicle 100 of FIG. 1 and other FIGS. herein for illustration purposes. It is noted that aspects of the process flow 600 may be performed by any suitable processing device or system, and various aspects may be implemented in whole or in part by various integrated or distributed circuits and controllers.

The process flow 500 begins at 501 and proceeds to 503 whereat a desired operating point is determined for example by receipt of a torque command such as the propulsion torque requests 136 ($T_{cmd}$) provided by the vehicle controller 103 and the motor speed as may be derived from the angular position ($\theta_e$) of the rotor shaft 125 from position sensor 182. At 505, efficiency maps corresponding to the combinations of motor system control parameters 512 and respective settings 513 (e.g., combinations I-VII, Table 1) may be referenced at the operating point and the combination of motor system control parameters 512 and respective settings 513 associated with the highest efficiency identified, for example through any suitable loss minimization function, efficiency maximization function, comparison, arbitration or equivalent at 507. From 507, the identified combination of the of the motor system control parameters and respective settings (i.e., combinations I-VII) may be provided to 509 for implementation of the desired operating point in motor torque and speed. The process flow 500 may return to the beginning at 501 for repetitive execution.

In an embodiment, at 515 other motor system efficiency tradeoff objectives may be considered and result in limits being placed upon combination of the motor system control parameters and the respective settings. For example, noise, vibration and harshness (NVH), motor bearing life, and RESS life impact of the various settings of the control parameters may be evaluated at 519. Certain combinations of the motor system control parameters and the respective settings may be undesirable at certain operating points. For example, bearing life may be negatively impacted at combinations of lower rotor speeds, higher torques and higher switching frequencies. Thus, at such operating conditions, higher switching frequencies may advantageously be avoided by temporarily withdrawing the motor system control parameters (i.e., higher FSW settings, combinations II, IV and VI) from control consideration. At 521, a decision may be made to avoid higher switching frequencies at 517 by limiting the respective settings 513 available and hence limiting the available efficiency maps corresponding to such combinations at 505. When no avoidance is deemed necessary, 521 may merely continue control at 509 without such limitations. Metrics related to noise, vibration and harshness (NVH), motor bearing life, RESS life impact and any other efficiency tradeoff objectives may be derived empirically or through simulation and may include objective and subjective considerations used in the impact evaluations at 519.

In an embodiment, the efficiency maps may be reduced by eliminating solutions for any given combination of the motor system control parameters and the respective settings that are dominated by solutions for other combinations of the motor system control parameters and the respective settings thus advantageously reducing the data storage resource requirements for the corresponding non-volatile memory data structures such as reference tables and reducing the processing throughput requirements of the minimization function, efficiency maximization function, comparison, arbitration or equivalent at 507. In an embodiment, the efficiency map reductions may be accomplished through a Pareto front analysis considering a set of motor system optimization objectives in addition to the motor system efficiency. In an embodiment, exemplary motor system optimization objectives may include noise, vibration and harshness (NVH), motor bearing life, and RESS life. Metrics related to noise, vibration and harshness (NVH), motor bearing life, RESS life impact and any other motor system optimization objectives may be derived empirically or through simulation and may include objective and subjective considerations used the Pareto front analysis and may have respective values associated with operating point in each of the combinations of the motor system control parameters and the respective settings in the same manner as the motor efficiency. The Pareto front analysis, therefore, may be performed considering the motor system optimization objectives of NVH, motor bearing life, and RESS life in addition to the motor system efficiency. In an embodiment, the non-dominated solutions of the reduced efficiency maps may be evaluated through any suitable loss minimization function, efficiency maximization function, comparison, arbitration or equivalent at 507 to identify the combination of the of the motor system control parameters and respective settings (i.e., combinations I-VII) for provision to 509 for implementation of the desired operating point in motor torque and speed. In an alternate embodiment, an optimization function may provide an optimization score at each operating point for the non-dominated solutions wherein the optimization function considers all motor system optimization objectives (i.e., NVH, motor bearing life, and RESS life) and the motor system efficiency. The optimization function may include non-equivalent weights for each motor system optimization objective and the motor system efficiency. The optimization scores for each of the non-dominated solutions of the reduced efficiency maps may be evaluated such as with a comparison, arbitration or equivalent at 507 to identify the highest score and the corresponding combination of the of the motor system control parameters and respective settings (i.e., combinations I-VII) for provision to 509 for implementation of the desired operating point in motor torque and speed.

At 505, efficiency maps corresponding to the combinations of motor system control parameters 512 and respective settings 513 (e.g., combinations I-VII, Table 1) may be referenced at the operating point and the combination of motor system control parameters 512 and respective settings 513 associated with the highest efficiency identified, for example through any suitable loss minimization function, efficiency maximization function, comparison, arbitration or equivalent at 507.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

All numeric values herein are assumed to be modified by the term "about" whether or not explicitly indicated. For the purposes of the present disclosure, ranges may be expressed as from "about" one particular value to "about" another particular value. The term "about" generally refers to a range of numeric values that one of skill in the art would consider equivalent to the recited numeric value, having the same function or result, or reasonably within manufacturing tolerances of the recited numeric value generally. Similarly, numeric values set forth herein are by way of non-limiting example and may be nominal values, it being understood that actual values may vary from nominal values in accordance with environment, design and manufacturing tolerance, age and other factors.

When an element such as a layer, film, region, or substrate is referred to as being "on" another element, it can be directly on the other element or intervening elements may also be present. In contrast, when an element is referred to as being "directly on" another element, there are no intervening elements present. Therefore, unless explicitly described as being "direct," when a relationship between first and second elements is described in the above disclosure, that relationship may be a direct relationship where no other intervening elements are present between the first and second elements but may also be an indirect relationship where one or more intervening elements are present (either spatially or functionally) between the first and second elements.

One or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Unless defined otherwise, technical and scientific terms used herein have the same meaning as is commonly understood by one of skill in the art to which this disclosure belongs.

Unless specified to the contrary herein, all test standards are the most recent standard in effect as of the filing date of this application, or, if priority is claimed, the filing date of the earliest priority application in which the test standard appears.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of controlling a motor system including a rechargeable energy storage system (RESS), an alternating current (AC) motor and a power inverter therebetween, comprising:
   providing a plurality of efficiency maps for control use consideration, each efficiency map corresponding to a respective predetermined combination of at least two motor system control parameters and relating a motor operating space in motor torque and motor speed to corresponding motor system efficiency solutions, wherein at least one of the at least two motor system control parameters includes at least two respective selectable settings;
   receiving a motor speed signal;
   receiving a motor torque command;
   determining from the plurality of efficiency maps a respective predetermined combination of the at least two motor system control parameters associated with a highest motor system efficiency solution at a motor operating point corresponding to the motor speed signal and the motor torque command; and
   controlling the motor based upon the respective predetermined combination of the at least two motor system control parameters.

2. The method of claim 1, wherein the motor system control parameters comprise a pulse-width modulation (PWM) scheme for operating the power inverter, a switching frequency for the power inverter, a gate drive parameter for the power inverter, and a direct current (DC) link voltage provided by the RESS to the power inverter.

3. The method of claim 2, wherein the pulse-width modulation (PWM) scheme comprises a first respective selectable setting that is a space vector pulse width modulation and a second respective selectable setting that is one of a generalized discontinuous pulse width modulation and a fractional duty pulse width modulation.

4. The method of claim 2, wherein the switching frequency comprises a first respective selectable setting that is a first frequency and a second respective selectable setting that is a second frequency, wherein the second frequency is a multiple of the first frequency.

5. The method of claim 2, wherein the gate drive parameter comprises a first respective selectable setting that is a first gate resistance and a second respective selectable setting that is a second gate resistance, wherein the second gate resistance is greater than the first gate resistance.

6. The method of claim 2, wherein the DC link voltage comprises a first respective selectable setting that is a first voltage and a second respective selectable setting that is a second voltage, wherein the second voltage is a multiple of the first voltage.

7. The method of claim 1, wherein the motor system control parameters consist of a pulse-width modulation (PWM) scheme for operating the power inverter, a switching frequency for the power inverter, a gate drive parameter for the power inverter, and a direct current (DC) link voltage provided by the RESS to the power inverter.

8. The method of claim 1, wherein all of the at least two motor system control parameters include at least two respective selectable settings.

9. The method of claim 1, wherein each efficiency map is reduced by eliminating respective motor system efficiency solutions within the motor operating space in motor torque and motor speed that are dominated by motor system efficiency solutions within the motor operating space in motor torque and motor speed of the other efficiency maps through a Pareto front analysis considering a set of motor system optimization objectives.

10. The method of claim 9, wherein the set of motor system optimization objectives comprises a first metric of noise, vibration and harshness, a second metric of motor bearing life, and a third metric of RESS life.

11. The method of claim 1, wherein at least one of the plurality of efficiency maps is withdrawn from control consideration based upon a determined unacceptable effect upon at least one of a set of motor system efficiency trade off objectives at the motor operating point.

12. The method of claim 11, wherein the set of motor system efficiency trade off objectives comprises a first metric of noise, vibration and harshness, a second metric of motor bearing life, and a third metric of RESS life.

13. A method of controlling a motor system including a rechargeable energy storage system (RESS), an alternating current (AC) motor and a power inverter therebetween, comprising:
providing a plurality of efficiency maps for control use consideration, each efficiency map corresponding to a respective predetermined combination of at least two motor system control parameters and relating a motor operating space in motor torque and motor speed to corresponding motor system efficiency solutions, wherein at least one of the at least two motor system control parameters includes at least two respective selectable settings;
establishing a motor operating point corresponding to a motor speed signal and a motor torque command;
withdrawing a respective efficiency map from control use consideration based upon its determined unacceptable effect upon at least one of a set of motor system efficiency trade off objectives at the motor operating point;
determining from the plurality of efficiency maps available for control use consideration a respective predetermined combination of the at least two motor system control parameters associated with a highest motor system efficiency solution at the motor operating point; and
controlling the motor based upon the respective predetermined combination of the at least two motor system control parameters.

14. The method of claim 13, wherein the motor system control parameters comprise a pulse-width modulation (PWM) scheme for operating the power inverter, a switching frequency for the power inverter, a gate drive parameter for the power inverter, and a direct current (DC) link voltage provided by the RESS to the power inverter.

15. The method of claim 14, wherein all of the at least two motor system control parameters include at least two respective selectable settings.

16. The method of claim 13, wherein each efficiency map is reduced by eliminating respective motor system efficiency solutions that are dominated by motor system efficiency solutions of the other efficiency maps through a Pareto front analysis considering a set of motor system optimization objectives.

17. The method of claim 16, wherein the set of motor system optimization objectives comprises a first metric of noise, vibration and harshness, a second metric of motor bearing life, and a third metric of RESS life.

18. The method of claim 13, wherein the motor system control parameters consist of a pulse-width modulation (PWM) scheme for operating the power inverter, a switching frequency for the power inverter, a gate drive parameter for the power inverter, and a direct current (DC) link voltage provided by the RESS to the power inverter.

19. An electrified powertrain, comprising:
a rechargeable energy storage system (RESS);
a traction power inverter module (TPIM) connected to the RESS, and configured to change a direct current (DC) voltage from the RESS to a multi-phase alternating current (AC) voltage;
a rotary electric machine energized by the multi-phase AC voltage from the TPIM over a multi-phase AC bus, and comprising:
a stator having multi-phase AC stator windings;
a rotor; and
a rotor shaft connected to and surrounded by the rotor, and configured to rotate about an axis of rotation in conjunction with the rotor when the rotary electric machine is energized;
a transmission coupled to the rotor shaft and powered by the rotary electric machine; and
a controller
providing a plurality of efficiency maps for control use consideration, each efficiency map corresponding to a respective predetermined combination of a plurality of motor system control parameters and relating a motor operating space in motor torque and motor speed to corresponding motor system efficiency solutions, wherein each of a plurality of motor system control parameters includes at least two respective selectable settings;
establishing a motor operating point corresponding to a motor speed signal and a motor torque command;
withdrawing a respective efficiency map from control use consideration based upon its determined unacceptable effect upon at least one of a set of motor system efficiency trade off objectives at the motor operating point;
reducing each efficiency map by eliminating respective motor system efficiency solutions that are dominated by motor system efficiency solutions of the other efficiency maps through a Pareto front analysis considering respective values of a set of motor system optimization objectives;
determining from the plurality of reduced efficiency maps available for control use consideration a respective predetermined combination of the plurality of motor system control parameters associated with one of a) a highest motor system efficiency solution at the motor operating point and b) a highest optimization score from an optimization function performed against the respective values of the set of motor system optimization objectives corresponding to each reduced efficiency map having a respective non-dominated solution at the motor operating point; and
controlling the rotary electric machine based upon the respective predetermined combination of the plurality of motor system control parameters.

20. The electrified powertrain of claim 19, wherein the set of motor system efficiency trade off objectives and the set of motor system optimization objectives each comprises a respective first metric of noise, vibration and harshness, a respective second metric of motor bearing life, and a respective third metric of RESS life.

\* \* \* \* \*